(12) United States Patent
Chiba et al.

(10) Patent No.: US 10,945,128 B2
(45) Date of Patent: Mar. 9, 2021

(54) DATA FORWARDING SUPPORT IN DUAL CONNECTIVITY

(71) Applicant: Nokia Solutions and Networks Oy, Espoo (FI)

(72) Inventors: Tsunehiko Chiba, Saitama (JP); Henri Markus Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 195 days.

(21) Appl. No.: 15/524,753

(22) PCT Filed: Oct. 9, 2015

(86) PCT No.: PCT/EP2015/073412
§ 371 (c)(1),
(2) Date: May 5, 2017

(87) PCT Pub. No.: WO2016/071076
PCT Pub. Date: May 12, 2016

(65) Prior Publication Data
US 2017/0359854 A1    Dec. 14, 2017

Related U.S. Application Data

(60) Provisional application No. 62/076,838, filed on Nov. 7, 2014.

(51) Int. Cl.
*H04W 12/04*      (2009.01)
*H04W 76/15*      (2018.01)
(Continued)

(52) U.S. Cl.
CPC .  *H04W 12/0401* (2019.01); *H04W 12/04033* (2019.01); *H04W 36/0038* (2013.01);
(Continued)

(58) Field of Classification Search
CPC ............. H04W 12/04; H04W 36/0027; H04W 36/0038; H04W 36/0069; H04W 76/15; H04W 88/06; H04W 92/20
See application file for complete search history.

(56) References Cited

U.S. PATENT DOCUMENTS

2015/0215827 A1\* 7/2015 Zhang ............... H04W 28/0247
370/331
2016/0044639 A1\* 2/2016 Yi ......................... H04W 12/04
370/329
(Continued)

OTHER PUBLICATIONS

3GPP TSG RAN WG2 Meeting #87bis, Shanghai, China, Oct. 6-10, 2014, R2-144512, "Discussion on Intra-MeNB HO and Capturing in Stage 2", Alcatel-Lucent et al., 4 pgs.
(Continued)

*Primary Examiner* — Kan Yuen
(74) *Attorney, Agent, or Firm* — Harrington & Smith

(57) ABSTRACT

Data forwarding may be useful in many communication systems. Thus, for example, data forwarding support may be useful in dual connectivity in, for example, the third generation partnership project (3GPP) and more particularly to dual connectivity with enabled downlink (DL) data back forwarding. A method can include receiving, by a first network node, an indication indicating that for at least one split bearer, data received prior to the indication is to be forwarded to a second network node. The indication can also indicate that the at least one split bearer should be kept or maintained at the first network node. The method can also include, in response to the received indication, forwarding the data for the at least one split bearer received prior to the indication to the second network node.

21 Claims, 6 Drawing Sheets

(51) Int. Cl.
*H04W 36/00* (2009.01)
*H04W 88/06* (2009.01)
*H04W 92/20* (2009.01)
*H04W 12/00* (2021.01)

(52) U.S. Cl.
CPC .......... *H04W 76/15* (2018.02); *H04W 88/06* (2013.01); *H04W 12/001* (2019.01); *H04W 36/0027* (2013.01); *H04W 36/0069* (2018.08); *H04W 92/20* (2013.01)

(56) References Cited

U.S. PATENT DOCUMENTS

| | | | |
|---|---|---|---|
| 2017/0086254 A1* | 3/2017 | Lee | H04L 5/0098 |
| 2017/0134998 A1* | 5/2017 | Xu | H04W 36/08 |
| 2017/0215225 A1* | 7/2017 | Yi | H04W 12/0017 |
| 2018/0176839 A1* | 6/2018 | Ohara | H04W 16/32 |

OTHER PUBLICATIONS

3GPP TSG-RAN WG3 Meeting #83bis, San Jose del Cabo, Mexico, Mar. 31-Apr. 4, 2014, R3-140816, "When and How to Support Data Forwarding for Dual Connectivity", Ericsson, 7 pgs.
3GPP TSG-RAN WG3 #84, Seoul, Korea, May 19-23, 2014, R3-141277, "Data Forwarding for Split Bearer Option", NEC, 2 pgs.
3GPP TSG-RAN WG3 #85bis, Shanghai, P.R. China, Oct. 6-10, 2014, R3-142172, "Consideration of Key Refresh Procedure", CATT, 6 pgs.
3GPP TSG-RAN WG3 #85bis, Oct. 6-10, 2014, Shanghai, China, R3-142396, "On Data Forwarding for Split Bearer", R3-142396, NTT DOCOMO, Inc., et al., 4 pgs.

* cited by examiner

FIG 4

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Spare | Key Change Ind. | Final Frame Ind. | Lost Packet Report | 1 |
| Highest successfully delivered PDCP Sequence Number | | | | | | | | 2 |
| Desired buffer size for the E-RAB | | | | | | | | 4 |
| Desired buffer size for the UE | | | | | | | | 4 |
| TEID for receiving forwarded data | | | | | | | | 4 |
| Number of lost X2-U Sequence Number ranges reported | | | | | | | | 1 |
| Start of lost X2-U Sequence Number range | | | | | | | | 4*(Number of reported lost X2-u SN ranges) |
| End of lost X2-U Sequence Number range | | | | | | | | |
| Spare extension | | | | | | | | 0-4 |

DATA FORWARDING SUPPORT IN DUAL CONNECTIVITY

CROSS-REFERENCE TO RELATED APPLICATION

This application is related to and claims the benefit and priority of U.S. Provisional Patent Application No. 62/076,838, filed Nov. 7, 2014, the entirety of which is hereby incorporated herein by reference.

BACKGROUND

Field

Data forwarding may be useful in many communication systems. Thus, for example, data forwarding support may be useful in dual connectivity in, for example, the third generation partnership project (3GPP) and more particularly to dual connectivity with enabled downlink (DL) data back forwarding.

Description of the Related Art

Dual connectivity (DC) is a mode of operation of a user equipment (UE) in radio resource control (RRC) connected (RRC_CONNECTED), configured with a master cell group (MCG) and a secondary cell group (SCG).

FIG. 1 illustrates C-Plane architecture for dual connectivity. More particularly, FIG. 1 illustrates C-Plane connectivity of eNBs involved in dual connectivity. As shown in FIG. 1, a mobility management entity (MME) can be connected over interface S1-MME to a master evolved Node B (MeNB). In turn, the MeNB can be connected over interface X2-C with a secondary eNB (SeNB).

FIG. 2 illustrates U-plane architecture for dual connectivity. More particularly, FIG. 2 illustrates U-Plane connectivity of eNBs involved in dual connectivity. As shown in FIG. 2, a serving gateway (S-GW) can be separately connected to each of MeNB and SeNB over respective S1-U interfaces. Moreover, the MeNB and SeNB can be connected to one another over an X2-U interface.

In dual connectivity, there can be three types of bearer. For MCG bearers, the MeNB can be U-plane connected to the S-GW via S1-U, and the SeNB may not be involved in the transport of user plane data. For split bearers, the MeNB can be U-plane connected to the S-GW via S1-U and in addition, the MeNB and the SeNB can be interconnected via X2-U. For SCG bearers, the SeNB can be directly connected with the S-GW via S1-U.

For split bearers, all the downlink (DL) data can go through the MeNB, and the MeNB can deliver some of the DL data to the UE directly and some via the SeNB.

More specifically, when the MeNB receives the packet data convergence protocol (PDCP) service data unit (SDU) for the split bearer, the MeNB can build the PDCP protocol data unit (PDU). Next, a flow control entity can calculate how much data can be delivered toward the SeNB based on the SeNB's information, such as allowed buffer size and the aggregated bandwidth in SeNB. When the SeNB receives the PDCP PDUs, the SeNB can buffer them until the PDCP PDUs are acknowledged by the UE. During such operation, assuming that lossless requirement applies also for Dual Connectivity, a possible scenario that may necessitate data forwarding from SeNB back to MeNB is SeNB release or SeNB change.

When SeNB release/change is triggered, (Source-)SeNB may forward the unacknowledged data to MeNB or Target-SeNB directly. The purpose of this forwarding may be to relax the requirement of the buffer size in MeNB so that MeNB can delete the PDCP PDUs immediately after forwarding them to SeNB. Not performing data forwarding from SeNB implies that all the data is buffered in the MeNB.

SUMMARY

According to a first embodiment, a method can include receiving, by a first network node, an indication indicating that for at least one split bearer, downlink data received prior to the indication is to be forwarded to a second network node, and that the at least one split bearer should be kept or maintained at the first network node. The method can also include, in response to the received indication, forwarding the data for the at least one split bearer received prior to the indication to the second network node.

In a variant, the data to be forwarded can include all downlink data still available at the first network node that was received prior to the indication.

In a variant, the indication can indicate that the split bearer is not to be released.

In a variant, a reason for the indication can be a change of ciphering key for the at least one split bearer.

In a variant, the method can further include, after receiving the indication, receiving and relaying downlink data for the at least one split bearer.

In a variant, the method can be performed by a secondary base station.

According to a second embodiment, a method can include sending, by a second network node, an indication to a first network node, the indication indicating that for at least one split bearer, downlink data received prior to the indication is to be forwarded by the first network node to the second network node, and that the at least one split bearer should be kept or maintained at the first network node.

In a variant, the data to be forwarded can include all downlink data still available at the first network node that was received prior to the indication.

In a variant, the indication can indicate that the split bearer is not to be released.

In a variant, the sending can be in response to the second network node determining that a ciphering key is to be changed for the at least one split bearer.

In a variant, the method can also include receiving, for the at least one split bearer, downlink data forwarded by the first network node. The method can further include deciphering the forwarded data using an old ciphering key. The method can additionally include ciphering the forwarded and deciphered data using a new ciphering key.

In a variant, the method can be performed by a master base station.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to tenth and eleventh embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein:

FIG. 4 illustrates a flow control based approach according to certain embodiments.

DETAILED DESCRIPTION

The data forwarding from SeNB may be beneficial. However, in addition to the case of SeNB release or SeNB change, whenever there is a change to the ciphering key of a split bearer, the SeNB may need to forward PDCP PDUs back to MeNB, which will have to decipher them using the old key, and then either re-cipher the resulting PDCP SDUs using the new key, or forward them to the target eNB. If the ciphering key changes for the split bearer, the DL data transmitted to the SeNB cannot be deciphered at the UE.

Certain embodiments provide a new signaling indication from the MeNB to the SeNB, by which the MeNB can inform the SeNB of a change of ciphering key for a split bearer. Upon receiving this newly proposed indication, the SeNB can know to forward the pending downlink data to the MeNB.

Figure 3:
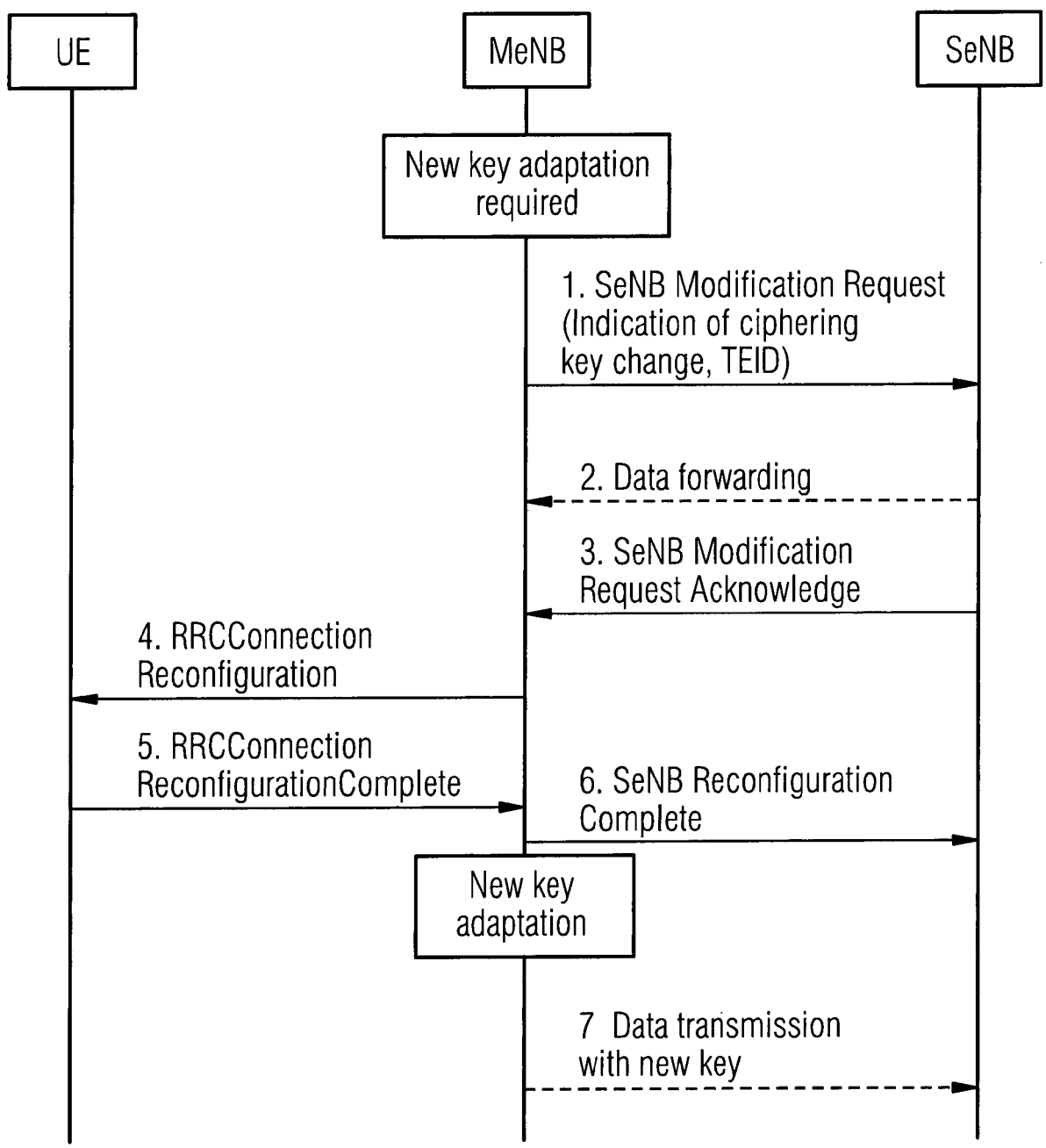
FIG. 3 illustrates an X2AP based approach, according to certain embodiments.

According to a first alternative, the MeNB can send an SeNB modification request to the SeNB to indicate the ciphering key change for split bearer. FIG. 3 illustrates an X2AP based approach, according to certain embodiments.

As shown in FIG. 3, once the MeNB recognizes that new key adaptation is required, the MeNB can, at 1, provide an SeNB Modification Request containing an indication of ciphering key change for split bearer. On receipt of this indication message, at 2 the SeNB can start the data forwarding to the MeNB. These forwarded packets can be deciphered by the old key. At 3, the SeNB can acknowledge the modification request. Then, at 4 and 5 RRC connection reconfiguration can take place between the MeNB and the UE. After the RRC procedure is completed, the MeNB can report this to the SeNB at 6. The MeNB can then, at 7, start data transmission to the previous SeNB or a new target SeNB in the case of inter-SeNB change.

FIG. 4 illustrates a flow control based approach according to certain embodiments. In a second alternative, instead of an SeNB modification request, the MeNB can send a flow control indication to the SeNB to indicate the ciphering key change for split bearer. In this alternative, the MeNB can provide the indication of ciphering key change by flow control information within a GTP-U extension header. Once the SeNB receives this indication, the SeNB can start data forwarding to the MeNB.

The data forwarding from SeNB to MeNB can be beneficial as described above. Key change at the MeNB can sometimes happen, such as at an intra-MeNB handover. Certain embodiments may avoid data loss during the ciphering key change for split bearer.

Figure 5:
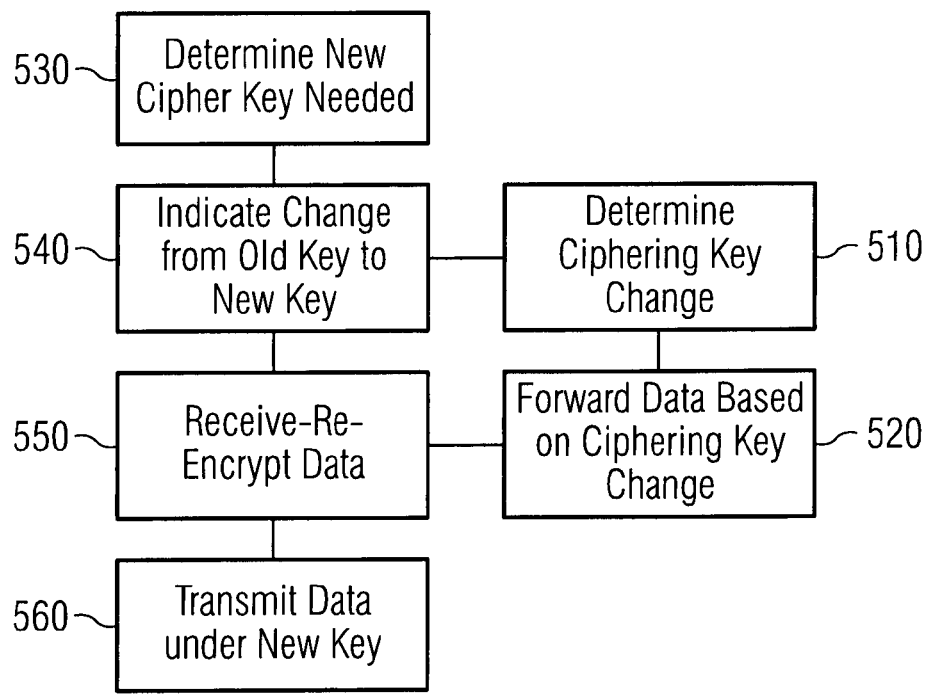
FIG. 5 illustrates a method according to certain embodiments.

FIG. 5 illustrates a method according to certain embodiments. As shown in FIG. 5, a method can include, at 510, determining that a ciphering key of a split bearer has changed from an old key to a new key. The method can also include, at 520, forwarding data associated with the old key from a secondary base station to a master base station based on the determination that the ciphering key of the split bearer has changed. The secondary base station may be an SeNB. The master base station may be an MeNB.

The determining can include receiving an indication that the ciphering key has changed. Other ways of determining are also permitted, such as determining that there has been or is going to be an intra-MeNB handover. The indication can be received from the master base station. Thus, the determining and forwarding can be performed by the secondary base station. The data associated with the old key can include pending downlink data.

Likewise, the method can include, at 530, determining that a new ciphering key of a split bearer is needed. The method can also include, at 540, communicating an indication of the change from an old ciphering key to a new ciphering key, together with information for forwarding data responsive to the indication, from a master base station to a secondary base station.

The information for forwarding data responsive to the indication can include a tunnel endpoint identifier, as illustrated in FIG. 3. This determining and communicating can be performed by the master base station.

In certain embodiments, such as those employing a flow control base approach, the indication can be provided in a general packet radio service (GPRS) tunneling protocol user plane (GTP-U) extension header. Moreover, the information can also be provided in the general packet radio service tunneling protocol user plane extension header. Thus, for example, both an indication (such as a one-bit key change indicator) and information as to where to forward the data (such as a one-byte TEID for receiving forwarded data) can be provided in a single header, as illustrated for example in FIG. 4.

It should be noted that in certain embodiments, the ciphering may be fully terminated at MeNB and may be fully transparent to SeNB. Thus, the SeNB may not know that the reason for the forwarding-back of data for the split bearer is a change of ciphering key. Thus, the determination that the ciphering key has changed may not be performed by SeNB in certain embodiments. The data to be forwarded back by SeNB may be the data that the SeNB has received from MeNB prior to indication. The SeNB may also receive data after this indication, but the SeNB may have no way of determining only from the data itself, what has been ciphered with what key, because to the SeNB it may all just appear to be ciphered data. The indication, therefore, in certain embodiments may not specify that there is a change in ciphering key, even though it may be a change in ciphering key that triggered the communication of the indication.

The method can further include, at 550, receiving and re-encrypting the data forwarded by the SeNB. The method can additionally include, at 560, transmitting the data under the new key.

Figure 6:
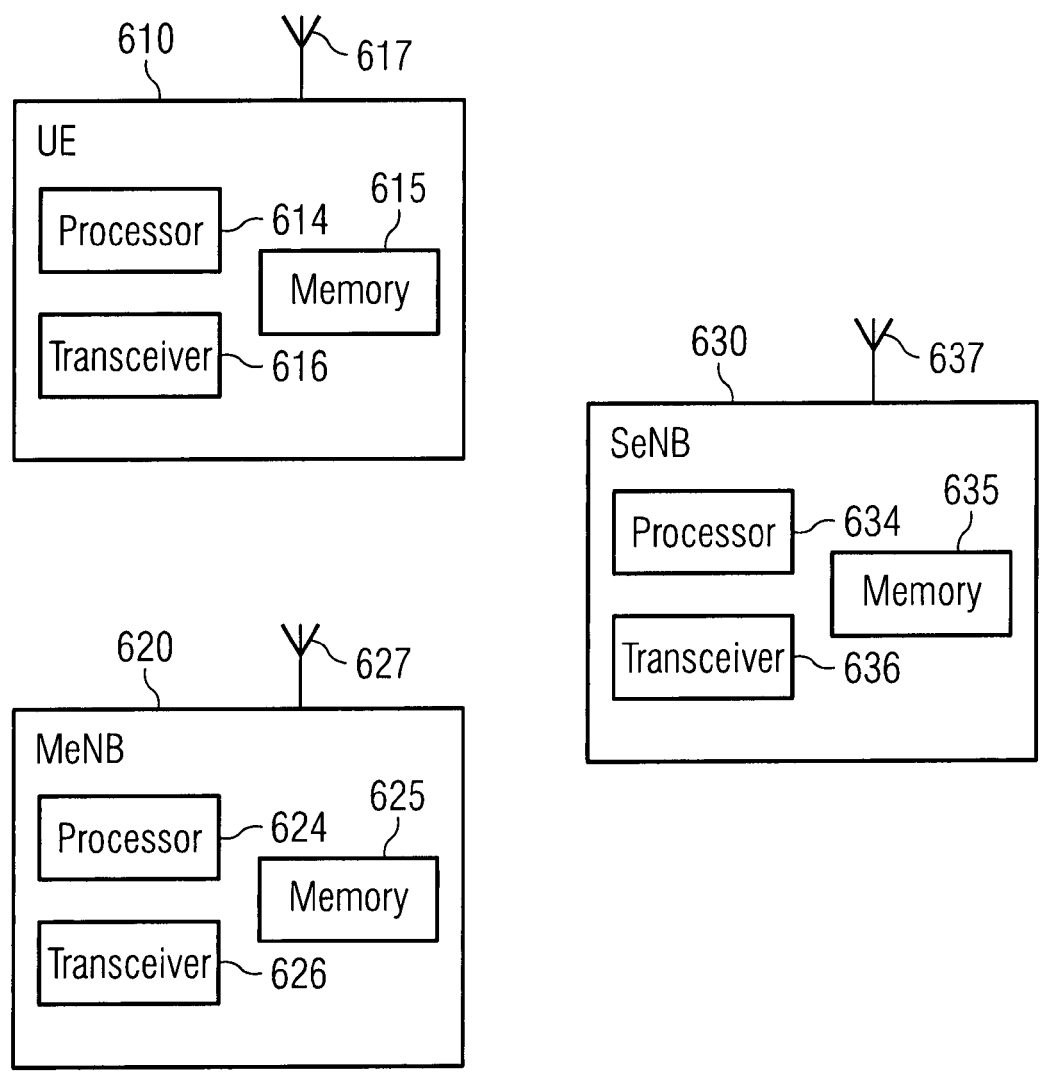
FIG. 6 illustrates a system according to certain embodiments.

FIG. 6 illustrates a system according to certain embodiments of the invention. In one embodiment, a system may include multiple devices, such as, for example, at least one UE 610, at least one MeNB 620, which may be an eNB or other base station or access point, and at least one SeNB 630, which may be an eNB or other base station or access point.

Each of these devices may include at least one processor, respectively indicated as 614, 624, and 634. At least one memory can be provided in each device, and indicated as 615, 625, and 635, respectively. The memory may include computer program instructions or computer code contained therein. The processors 614, 624, and 634 and memories 615, 625, and 635, or a subset thereof, can be configured to provide means corresponding to the various blocks of FIG. 5 or FIG. 7.

As shown in FIG. 6, transceivers 616, 626, and 636 can be provided, and each device may also include an antenna, respectively illustrated as 617, 627, and 637. Other configurations of these devices, for example, may be provided. For example, SeNB 630 may be configured for wired communication, in addition to wireless communication, and in such a case antenna 637 can illustrate any form of communication hardware, without requiring a conventional antenna.

Transceivers 616, 626, and 636 can each, independently, be a transmitter, a receiver, or both a transmitter and a receiver, or a unit or device that is configured both for transmission and reception.

Processors 614, 624, and 634 can be embodied by any computational or data processing device, such as a central processing unit (CPU), application specific integrated circuit (ASIC), or comparable device. The processors can be implemented as a single controller, or a plurality of controllers or processors.

Memories 615, 625, and 635 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

Figure 7:
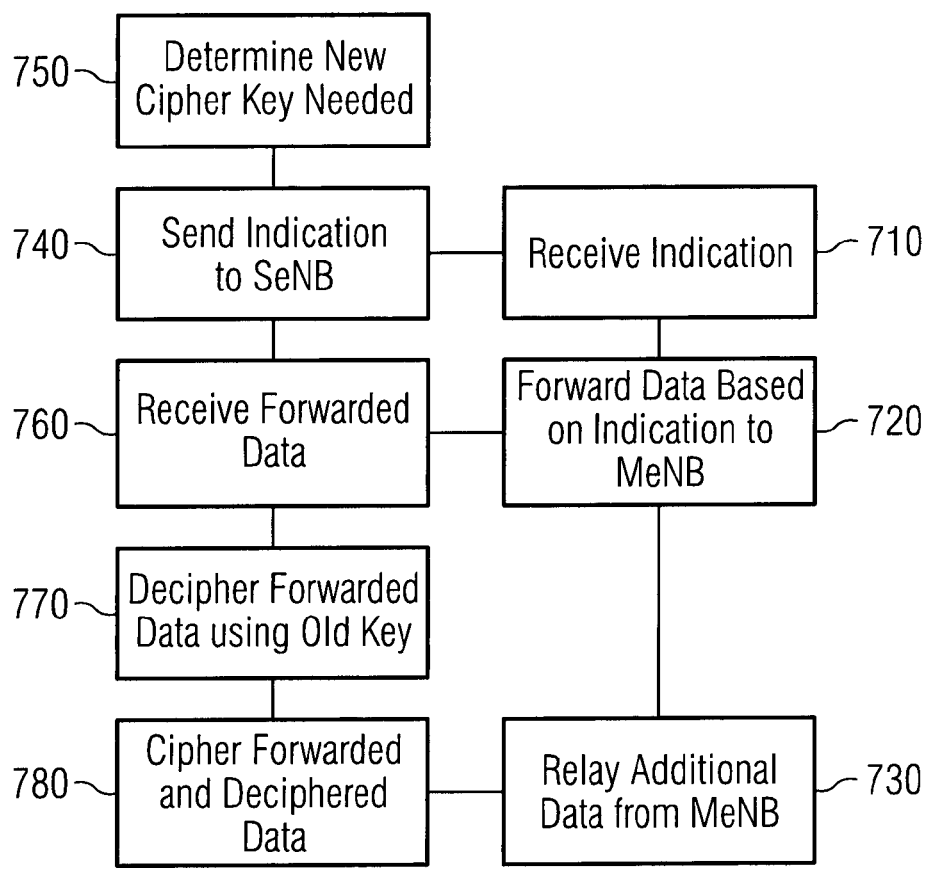
FIG. 7 illustrates a further method according to certain embodiments.

The memory and the computer program instructions can be configured, with the processor for the particular device, to cause a hardware apparatus such as UE 610, MeNB 620, and SeNB 630, to perform any of the processes described herein (see, for example, FIG. 5 or FIG. 7). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Figure 1:
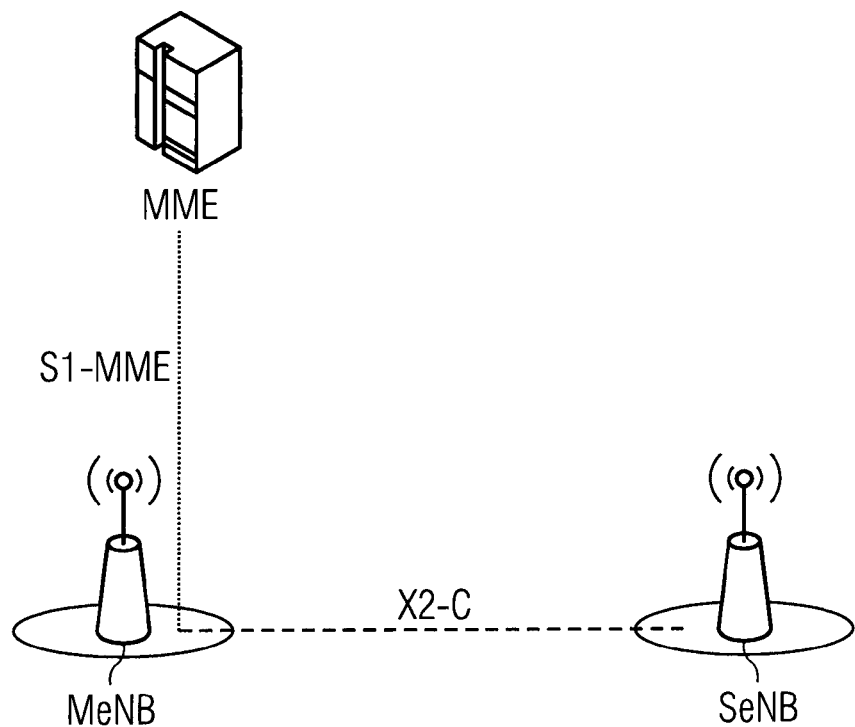
FIG. 1 illustrates C-Plane architecture for dual connectivity.
Figure 2:
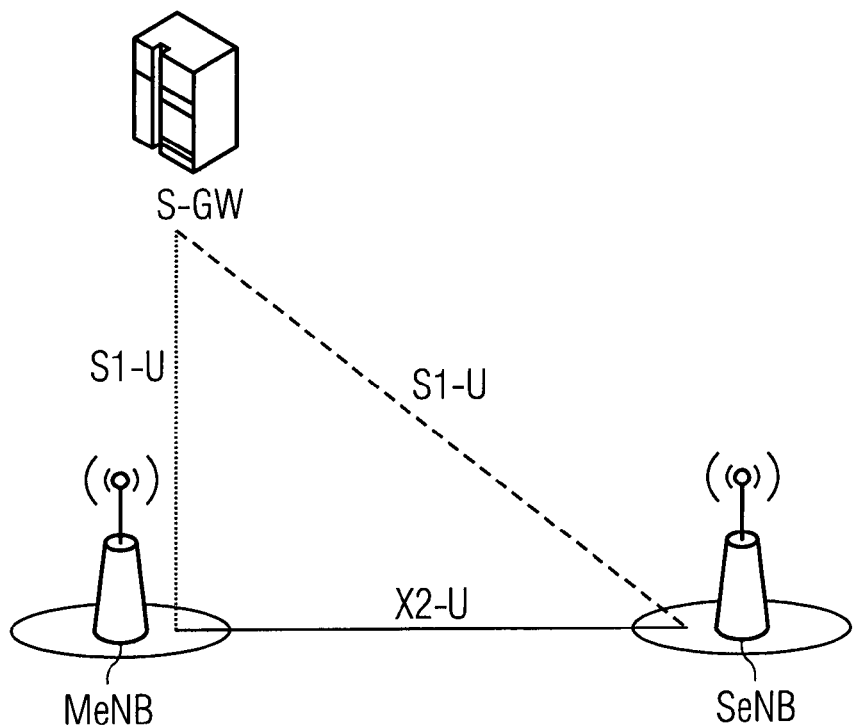
FIG. 2 illustrates U-plane architecture for dual connectivity.

Furthermore, although FIG. 6 illustrates a system including a UE, MeNB, and SeNB, embodiments of the invention may be applicable to other configurations, and configurations involving additional elements. For example, not shown, additional UEs may be present, and additional core network elements may be present, as illustrated in FIGS. 1 and 2.

FIG. 7 illustrates a further method according to certain embodiments. Although shown separately, the method of FIG. 7 may be combined with the method of FIG. 5. As shown in FIG. 7, a method can include, at 710, receiving, by a first network node, an indication indicating that for at least one split bearer, data received prior to the indication is to be forwarded to a second network node. The data to be forwarded can include all data still available at the first network node that was received prior to the indication. The indication can also indicate that the at least one split bearer should be kept or maintained at the first network node. For example, the indication can indicate that the split bearer is not to be released or may be in the form of an indication that does not indicate or imply that the split bearer is to be released.

The method can also include at 720, in response to the received indication, forwarding the data for the at least one split bearer received prior to the indication to the second network node.

A reason for the indication can be a change of ciphering key for the at least one split bearer. As noted above, this reason may not be known to the first network node in certain embodiments.

The method can further include, after receiving the indication, at 730 receiving and relaying data for the at least one split bearer.

The first network node can be a secondary base station and the second network node can be a master base station.

The method can include, at 740, sending, by the second network node, the indication to the first network node. The sending can be in response to the second network node determining, at 750, that a ciphering key is to be changed for the at least one split bearer.

In a variant, the method can also include, at 760 receiving, for the at least one split bearer, data forwarded by the first network node. The method can further include, at 770, deciphering the forwarded data using an old ciphering key. The method can additionally include, at 780, ciphering the forwarded and deciphered data using a new ciphering key. This re-ciphered data can then be provided to the first network node, which relay the data to one or more UE.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

DL Down Link
MeNB Master eNB
PDCP Packet Data Convergence Protocol
PDU Packet Data Unit
SeNB Secondary eNB
SCG Secondary Cell Group
TEID Tunnel Endpoint Identifier
MCG Master Cell Group
UE User Equipment

We claim:

1. A method, comprising:
receiving, with a first network node, an indication indicating that for at least one split bearer, unacknowledged downlink data received prior to the indication is to be forwarded to a second network node, and that the at least one split bearer should be kept or maintained at the first network node, wherein a reason for the indication comprises a change of ciphering key for the at least one split bearer; and
in response to the received indication, forwarding the data for the at least one split bearer received prior to the indication to the second network node, wherein the forwarding of the data comprises forwarding data ciphered with an old ciphering key.

2. A method, comprising:
preparing, with a second network node, an indication, the indication indicating that for at least one split bearer, unacknowledged downlink data received prior to the indication is to be forwarded with a first network node to the second network node, and that the at least one split bearer should be kept or maintained at the first network node;
sending the indication to the first network node responsive to determining that a ciphering key is to be changed for the at least one split bearer;
receiving, for the at least one split bearer, downlink data forwarded with the first network node;
deciphering, with the second network node, the forwarded data using an old ciphering key; and
ciphering, with the second network node, the forwarded and deciphered data using a new ciphering key.

3. The method of claim 2, wherein the data to be forwarded comprises all downlink data still available at the first network node that was received prior to the indication.

4. The method of claim 2, wherein the indication is configured to indicate that the at least one split bearer is not to be released.

5. A computer program product embodied on a non-transitory computer readable storage medium, comprising instructions for performing a process, when executed on at least one processor, comprising the method according to claim 2.

6. A non-transitory computer readable medium encoded with instructions that, when executed in hardware, perform a process, the process comprising the method according to claim 2.

7. An apparatus, comprising:
at least one processor; and
at least one non-transitory memory including computer program code,
wherein the at least one memory and the computer program code are configured to, with the at least one processor, cause the apparatus at least to
receive an indication indicating that for at least one split bearer, unacknowledged downlink data received prior to the indication is to be forwarded to a second network node, and that the at least one split bearer should be kept or maintained at the apparatus, wherein a reason for the indication comprises a change of ciphering key for the at least one split bearer; and
in response to the received indication, forward the data for the at least one split bearer received prior to the indication to the second network node, wherein forwarding the data comprises forwarding data ciphered with an old ciphering key.

8. The apparatus of claim 7, wherein the data to be forwarded comprises all downlink data still available at the apparatus that was received prior to the indication.

9. The apparatus of claim 7, wherein the indication is configured to indicate that the at least one split bearer is not to be released.

10. The apparatus of claim 7, wherein the at least one memory and the computer program code are configured to, with the at least one processor, cause the apparatus at least to, after receiving the indication, receive and relay downlink data for the at least one split bearer.

11. The apparatus of claim 7, wherein the apparatus comprises a secondary base station.

12. An apparatus, comprising:
at least one processor; and
at least one non-transitory memory including computer program code,
wherein the at least one memory and the computer program code are configured to, with the at least one processor, cause the apparatus at least to
prepare an indication, the indication indicating that for at least one split bearer, unacknowledged downlink data received prior to the indication is to be forwarded with a first network node to the apparatus, and that the at least one split bearer should be kept or maintained at the first network node;
send the indication to the first network node responsive to determining that a ciphering key is to be changed for the at least one split bearer;
receive, for the at least one split bearer, downlink data forwarded with the first network node;
decipher the forwarded data using an old ciphering key; and
cipher the forwarded and deciphered data using a new ciphering key.

13. The apparatus of claim 12, wherein the data to be forwarded comprises all downlink data still available at the first network node that was received prior to the indication.

14. The apparatus of claim 12, wherein the indication is configured to indicate that the at least one split bearer is not to be released.

15. The apparatus of claim 12, wherein the apparatus comprises a master base station.

16. A computer program product embodied on a non-transitory computer readable storage medium, comprising instructions for performing a process, when executed on at least one processor, comprising the method according to claim 1.

17. A non-transitory computer readable medium encoded with instructions that, when executed in hardware, perform a process, the process comprising the method according to claim 1.

18. A computer program product embodied on a non-transitory computer readable storage medium, comprising instructions for performing a process, when executed on at least one processor, comprising the method according to claim 3.

19. A non-transitory computer readable medium encoded with instructions that, when executed in hardware, perform a process, the process comprising the method according to claim 3.

20. A computer program product embodied on a non-transitory computer readable storage medium, comprising instructions for performing a process, when executed on at least one processor, comprising the method according to claim 4.

21. A non-transitory computer readable medium encoded with instructions that, when executed in hardware, perform a process, the process comprising the method according to claim 4.

* * * * *